Patented Mar. 11, 1952

2,588,802

UNITED STATES PATENT OFFICE 2,588,802

KETOALIPHATIC ACIDS DERIVED FROM HYDROXY AND ALKOXY DIPHENYL ALKANES AND THE PRODUCTION THEREOF

Robert R. Burtner, Skokie, Ill., and Harry A. Arbit, Los Angeles, Calif., assignors to G. D. Searle & Co., Chicago, Ill., a corporation of Illinois No Drawing. Application April 10, 1950, Serial No. 155,126

13 Claims. (Cl. 260—520)

This invention relates to substituted phenylalkylbenzoylaliphatic acids, to salts thereof, and to methods for the production of such compounds. In particular this invention relates to compounds of the general structural formula

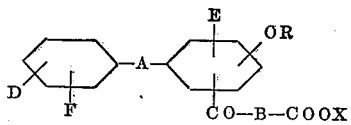

wherein A and B are bivalent aliphatic hydrocarbon radicals, E and F are members of the class consisting of hydrogen, halogen, hydroxyl, lower alkyl and alkoxyl radicals, D is a member of the class consisting of hydrogen, halogen, hydroxyl, lower alkoxyl and radicals of the type

R is a hydrogen or lower alkyl radical and X is hydrogen or one equivalent of a cation.

This application is a continuation-in-part of our copending application Serial No. 25,784, filed May 7, 1948, now abandoned.

In the foregoing structural formula, A represents a bivalent aliphatic hydrocarbon radical containing one to nine carbon atoms in a straight or branched chain arrangement such as methylene, ethylene, propylene, butylene, pentylene, hexylene, heptylene, octylene and polymethylene from trimethylene to octamethylene. Unsaturated aliphatic hydrocarbon radicals containing one or two double bonds, such as vinylene and allylene, are likewise within the scope of this invention. B is a member of the same class of bivalent aliphatic hydrocarbon radicals, excluding only methylene. R represents hydrogen or a lower alkyl radical such as methyl, ethyl, propyl, isopropyl, butyl, isobutyl, secondary-butyl, tertiary-butyl and the like. D, E and F represent hydrogen, fluorine, chlorine, bromine, iodine, hydroxyl, alkyl groups of the foregoing type and corresponding lower alkoxyl groups. X represents one equivalent of a cation such as hydrogen, an alkali metal ion, an alkaline earth metal ion, an ammonium ion and an amine ion. The object of this invention is to provide novel chemical substances of the type indicated above and to provide simple and economical methods of producing such substances. Further it is the object of the invention to provide feasible synthetic methods for the manufacture of the foregoing substances from readily available starting materials. In certain instances, it was found necessary to provide improved methods for obtaining such starting materials. For example, in the case of 2,4-dimethoxydiphenylmethane, the methods given in the literature are not satisfactory (cf. Skraup and Böhm, Ber. d. Deut. Chem. Ges. 59, 1011; 1926; and Klarmann, J. Am. Chem. Soc. 48, 792; 1926). We have discovered that this compound may be obtained by condensing at an elevated temperature m-dimethoxybenzene with benzyl chloride, and that yields are particularly good in the presence of a metallic catalyst, preferably copper or a copper compound such as the oxide, sulfate, chloride and the like.

The compounds of the invention are useful as therapeutic agents and as intermediates in chemical synthesis. Thus, certain of them are effective as choleretic agents. For this purpose, they may be administered in the form of the free acids or in the form of water soluble salts. Further, certain of these compounds are useful as parasiticidal agents. Certain of the compounds in which the bivalent aliphatic hydrocarbon radical, referred to herein as A, is highly branched are useful in the preparation of steroid-like compounds.

The compounds of this invention are prepared by reacting aralkylphenyl alkyl ethers with a dibasic aliphatic acid anhydride or halide derived from a dibasic acid of the following formula

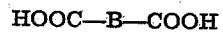

with a Friedel-Crafts type catalyst, generally in an inert organic solvent. Among such catalysts are anhydrous aluminum chloride, anhydrous ferric chloride, stannic chloride, boron trifluoride, zinc chloride, hydrogen fluoride, sodium-aluminum chloride and similar substances. The inert solvents are organic liquids having chemical reactivities lower than that of the foregoing ethers and include nitrobenzene, carbon disulfide, chlorobenzene, tetrachloroethane, and related substances. Among the dibasic acid anhydrides and halides which can be used in preparing these compounds are succinic, glutaric, adipic, pimelic, suberic, sebacic, maleic, fumaric, methyl succinic, ethyl succinic, alpha-methylglutaric, beta-methylglutaric, alpha-methyladipic and related dibasic acids. The mono-ester acid halides of the formula Alkyl—OOC—B—CO—X in which X is a halogen, preferably chlorine, are likewise useful in the preparation of such compounds.

The alkoxyl compounds obtained in the Friedel-Crafts reaction may be dealkylated to form the free hydroxyl derivatives by the usual methods such as by use of aluminum chloride or such hydrohalic acids as hydrobromic or hydriodic acid.

Salts of the keto acids which comprise this invention can be prepared by treatment of an alcoholic solution of the free keto acid with an alcoholic solution of an alkali, and subsequent evaporation or precipitation with a solvent in which the salt is insoluble, as for example, ether, benzene, acetone, and the like. Salts can be prepared of the alkali metals as well as water-soluble aliphatic or aliphatic-type bases, such as the lower mono-, di-, and trialkylamines, alkanolamines, and aliphatic-type cyclic amines such as morpholine. The salts are soluble in water and have the same properties as the free acids. They therefore constitute a preferred form of the compounds of this invention.

Our invention will be described more fully in conjunction with the following examples. It should be understood, however, that these examples are given by way of illustration only and the invention is not to be construed as limited in spirit or in scope by the details set forth. It will be apparent to those skilled in the art that many modifications in materials and methods may be made without departing from the invention. In each of these examples, temperatures are given in degrees centigrade, relative amounts of materials are given in parts by weight, and pressures during vacuum distillation are measured in millimeters (mm.) of mercury.

EXAMPLE 1

*Beta-(3-benzyl-4-methoxybenzoyl)propionic acid*

To an agitated suspension of 396 parts of o-benzylanisole and 200 parts of succinic anhydride in 2400 parts of nitrobenzene at 0° to 5° C. are added over 30 minutes 536 parts of anhydrous aluminum chloride with good agitation. The mixture is stirred for 2 hours longer at about 0° C. and then allowed to stand for 15 hours. The mixture is decomposed with ice and acid and steam distilled to remove solvent. The residue is chilled and the granular precipitate is removed and dissolved in 8000 parts of 2% sodium hydroxide solution. This alkaline solution is agitated with activated charcoal, filtered, and acidified. The precipitate of beta-(3-benzyl-4-methoxybenzoyl)-propionic acid is separated and dried. After recrystallization from methanol, it melts at about 133° C.

EXAMPLE 2

*Beta-(3-benzyl-4-hydroxybenzoyl)propionic acid*

A suspension of 10 parts of beta-(3-benzyl-4-methoxybenzoyl)propionic acid in 120 parts of hydriodic acid (specific gravity 1.7) and 25 parts of acetic anhydride is refluxed for 15 minutes during which time the acid dissolves. The resulting solution is poured into 200 parts of ice water. The precipitate of beta-(3-benzyl-4-hydroxybenzoyl)propionic acid is separated, washed and dried. It melts at about 185.5° C. after recrystallization from ethyl acetate.

EXAMPLE 3

*Beta-(3-benzyl-4-methoxybenzoyl)acrylic acid*

270 parts of anhydrous aluminum chloride are added over a 20-minute period to a stirred solution of 190 parts of o-benzylanisole and 98 parts of maleic anhydride in 1200 parts of nitrobenzene at 0° to 3° C. The mixture is agitated for 2 hours more at ice temperature and then allowed to stand for 15 hours slowly coming to room temperature during this time. The mixture is decomposed with ice and acid and steam distilled to remove solvent. The organic residue is dissolved in 8000 parts of 2% carbonate solution at room temperature. It is treated with activated charcoal at room temperature and filtered. The filtrate is acidified and the granular precipitate of beta-(3-benzyl-4-methoxybenzoyl)acrylic acid is separated, washed with water, dried, and recrystallized from ethyl acetate using decolorizing charcoal. It forms yellow needles melting at about 156° C.

EXAMPLE 4

*Beta-(2-methoxy-5-benzylbenzoyl)propionic acid*

804 parts of anhydrous aluminum chloride are added portionwise at 0° to 3° C. to an agitated suspension of 594 parts of p-benzylanisole and 300 parts of succinic anhydride in 3600 parts of nitrobenzene. The mixture is stirred for 2 hours longer at 0° C. and then allowed to stand overnight at room temperature. The addition complex is hydrolyzed and worked up in the manner described in Example 1. Crystallization from methanol using charcoal as a clarifying agent yields pale yellow crystals which melt at about 121° C.

EXAMPLE 5

*Beta-(2-hydroxy-5-benzylbenzoyl)propionic acid*

A suspension of 15 parts of beta-(2-methoxy-5-benzylbenzoyl)propionic acid in 135 parts of 47% hydriodic acid and 32.5 parts of acetic anhydride is refluxed for 35 minutes. The mixture is then diluted with ice water and the oily acid allowed to granulate. The precipitate is collected on a filter, triturated with water and dried. Recrystallization from ethyl acetate yields colorless crystals of pure beta-(2-hydroxy-5-benzyl)propionic acid, which melts at about 161° C. With ferric chloride an amethyst color is obtained.

EXAMPLE 6

*2,4-dimethoxydiphenylmethane*

An agitated mixture of 330 parts of m-dimethoxybenzene, 225 parts of benzyl chloride and 3 parts of copper powder is heated under reflux at 175° C. liquid temperature. The temperature is slowly raised to 200° C. during the course of two hours. The mixture is then filtered and the filtrate distilled at 0.1 mm. pressure. Unreacted m-dimethoxybenzene is collected first, followed by 213 parts of the 2,4-dimethoxydiphenylmethane which distils at 125° to 130° C. at that pressure. The $n_D^{25}$ is 1.5764. The distillation residue consists mainly of 2,4-dimethoxy-5-benzyldiphenylmethane, which on crystallization from ethanol melts at 98° C.

EXAMPLE 7

*Beta-(2,4-dimethoxy-5-benzylbenzoyl)propionic acid*

91 parts of succinic anhydride are reacted with 208 parts of 2,4-dimethoxydiphenylmethane in the presence of 244 parts of anhydrous aluminum chloride in 1200 parts of nitrobenzene at 0° to 5° C. according to the method of Example 1. The mixture is stirred for 20 minutes longer at 0° C., allowed to stand for 5 hours, and is quenched with ice and acid. The solvent is removed by steam distillation and the residue is taken up in 10,000 parts of 2% sodium carbonate solution at 90° C. The solution is chilled and extracted with ether. It is then acidified and an oily precipitate of beta-(2,4-dimethoxy-5-benzylbenzoyl) propionic acid soon granulates. This is washed with water, dried, and crystallized from methanol using decolorizing charcoal. The acid so obtained melts at about 177° C.

EXAMPLE 8

*Beta-[p-(2-methoxy-5-chlorobenzyl)benzoyl] propionic acid*

580 parts of 2-benzyl-4-chloroanisole $$n_D^{27} = 1.5862)$$

and 250 parts of succinic anhydride suspended in 3000 parts of nitrobenzene are reacted at 0° to 3° C. with 670 parts of anhydrous aluminum chloride, good agitation being maintained throughout the reaction. Stirring is continued for 6 hours at 0° C. and the mixture is then allowed to stand at room temperature for 15 hours. The addition complex is hydrolyzed by quenching with dilute hydrochloric acid and ice. The mixture is steam distilled to remove the solvent and the aqueous residue worked up as in Example 1. The crude beta-[p-(2-methoxy-5-chlorobenzyl)-benzoyl]propionic acid is crystallized first from benzene and then from methanol to produce colorless crystals which melt at about 144° to 145° C. with slight sintering at about 130° C.

EXAMPLE 9

*Beta-[p-(2-hydroxy-5-chlorobenzyl)benzoyl] propionic acid*

The acid described in Example 8 is demethylated by the method given in Example 2. The crude product is crystallized from acetic acid using charcoal as a decolorizing agent. The colorless crystals of the pure acid melt at about 200° to 201° C. with decomposition.

EXAMPLE 10

*Beta-[p-(2-methoxy-5-chlorobenzyl)benzoyl] acrylic acid*

58 parts of 2-benzyl-4-chloroanisole and 245 parts of maleic anhydride suspended in 3000 parts of nitrobenzene are reacted with good agitation with 670 parts of aluminum chloride added portionwise. The mixture is maintained at 0° C. during the addition and for 2 hours longer, efficient agitation being maintained throughout. The reaction mixture is allowed to stand for 15 hours at room temperature and is then quenched with dilute hydrochloric acid and ice. The acid is steam distilled to remove solvent and the aqueous residue chilled. The beta-[p-(2-methoxy-5-chlorobenzyl)benzoyl]acrylic acid is dissolved in a cold solution of aqueous alkali which is then washed with ether. To remove all traces of ether, the alkaline solution is aerated. Heating is to be avoided to prevent decomposition. Acidification produces a brown amorphous precipitate. On crystallization from methanol and then from benzene the pure acid is obtained which melts at about 162° C.

EXAMPLE 11

*Beta-[3-(o-methoxyphenethyl)-4-methoxybenzoyl]propionic acid and 2,2'-dimethoxy-5,5'-bis-(beta-carboxypropionyl)bibenzyl*

To an agitated suspension of 538 parts of 2,2'-dimethoxydiphenylethane and 220 parts of succinic anhydride in 2650 parts of nitrobenzene at 0° to 5° C. are added in the course of 30 minutes 590 parts of anhydrous aluminum chloride with good agitation. The mixture is stirred for 2 hours longer at 0° to 5° C. and then allowed to stand at room temperature for 15 hours. The reaction mixture is poured into ice water and hydrochloric acid and the solvent removed by steam distillation. The aqueous residue is chilled and the dark solid precipitate filtered, ground up, treated with water, refiltered and rinsed with water. The crude products are taken up in 10,000 parts of water containing 160 parts of sodium hydroxide at about 70° C. The solution is chilled, acidified and the gray mixture of acids collected on a filter, rinsed and dried. The mixture is extracted exhaustively with hot methanol and the hot extracts clarified with charcoal. The methanol solution is concentrated and treated with a large volume of warm water. The dark granular precipitate is recrystallized first from benzene and then from ethyl acetate, with the use of charcoal as a decolorizing agent. The colorless beta-[3-(o-methoxyphenethyl)-4-methoxybenzoyl]propionic acid melts at 141° to 142° C.

The methanol insoluble fraction is dried and the gray powder is converted by crystallization from acetic acid and decolorization with charcoal into minute nearly colorless crystals which melt at 250° C. with decomposition. This fraction has the following structure

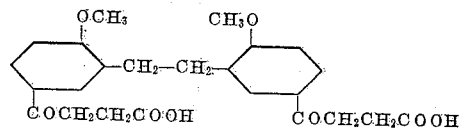

EXAMPLE 12

*Beta-[3-(o-hydroxyphenethyl)-4-hydroxybenzoyl]propionic acid*

The beta-[3-(o-methoxyphenethyl)-4-methoxybenzoyl]-propionic acid is demethylated by the method described in Example 2. The crude acid is leached with boiling benzene to remove impurities. The pure crystals melt at about 147° to 148° C.

EXAMPLE 13

*Omega-[3-(p-cymenyl)-4-methoxybenzoyl] valeric acid*

To an agitated suspension of 480 parts of o-(p-cumyl)anisole and 256 parts of adipic anhydride in 800 parts of nitrobenzene and 3200 parts of tetrachloroethane at 0° to 5° C. are added over 30 minutes 267 parts of anhydrous aluminum chloride. The mixture is stirred for three hours longer at 0° to 5° C. and then allowed to stand for 12 hours at room temperature. The product is hydrolyzed by quenching with ice and hydrochloric acid and steam distilled to remove the solvents. The residue is chilled, the precipitate removed and dissolved in a large volume of 2% sodium hydroxide solution. This solution is agitated with activated charcoal, filtered and acidified. The precipitated omega-[3-(p-cymenyl)-4-methoxybenzoyl]valeric acid is separated, washed with water and dried. Upon recrystallization from methanol, it forms colorless needles, which are moderately soluble in dilute alkali.

EXAMPLE 14

*Beta-[2-methyl-4-methoxy-5-(beta-phenylpropyl)benzoyl]propionic acid*

91 parts of succinic anhydride are reacted with 234 parts of 2-(beta-phenylpropyl)-5-methylanisole in the presence of 244 parts of anhydrous aluminum chloride in 1300 parts of nitrobenzene at 0° to 3° C. with vigorous agitation. After completion of the addition the mixture is stirred for 2 hours longer at 0° to 3° C., allowed to stand for 15 hours, and quenched with ice and acid. The solvent is removed by steam distillation and the residue worked up as in example 13. Recrystallization of the beta-[2-methyl-4-methoxy-5-(beta-phenylpropyl)benzoyl]propionic acid from methanol yields colorless needles, which are moderately soluble in dilute alkali.

EXAMPLE 15

*3-(4'-methoxyphenyl)-4-(3'-beta-carboxypropionyl-4'-methoxyphenyl)hexane*

A solution of 20 parts of 3,4-bis-(p-methoxyphenyl)hexane (meso form, melting point 140° to 142° C.) and 7 parts of succinic anhydride in 120 parts of nitrobenzene is cooled to 4° C. Then 21.3 parts of anhydrous aluminum chloride are added in small portions to the agitated solution, the temperature being maintained at 4° to 5° C. After the addition, the mixture is allowed to stand for about 15 hours. The reaction mixture is then poured into 200 parts of ice containing 30 parts of concentrated hydrochloric acid, and the nitrobenzene is removed by steam distillation. The residue is chilled, and the brown solid is separated and washed twice by decantation. It is then heated with a solution of 35 parts of sodium carbonate in 300 parts of water. The alkaline extract is treated with decolorizing charcoal and filtered. The filtrate is added slowly with stirring to an excess of 10% hydrochloric acid. The light-colored granular precipitate of the 3-(4'-methoxyphenyl)-4-(3'-beta-carboxypropionyl-4'-methoxyphenyl)hexane is collected on a filter, washed with water and dried.

This compound has the formula

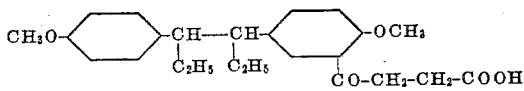

EXAMPLE 16

*3-(4'-hydroxyphenyl)-4-(3'-beta-carboxypropionyl-4'-hydroxyphenyl)hexane*

20 parts of the product obtained in Example 15 are demethylated by refluxing with a solution of 120 parts of hydriodic acid (specific gravity 1.7) in 80 parts of glacial acetic acid and 70 parts of acetic anhydride. After 2 hours of refluxing, the solution is poured into a mixture of ice and water. The solid thus obtained is collected on a filter, washed with water, and then dissolved in sodium carbonate solution. Addition of dilute hydrochloric acid throws down the high-melting form of the purified keto acid, 3-(4'-hydroxyphenyl)-4-(3'-beta-carboxypropionyl-4'-hydroxyphenyl)hexane which melts at about 85° to 95° C.

EXAMPLE 17

*3-(4'-methoxyphenyl)-4-(3'-beta-carboxypropionyl-4'-methoxyphenyl)hexane*

30 parts of 3,4-bis-(p-methoxyphenyl)hexane (racemic form, melting at 52° to 54° C.) and 10 parts of succinic anhydride in 150 parts of nitrobenzene are treated with 29.3 parts of aluminum chloride as in Example 15 and this form of 3(4'-methoxyphenyl)-4-(3'-beta-carboxypropionyl-4'-methoxyphenyl)hexane is isolated by the procedure of Example 15.

EXAMPLE 18

*3-(4'-hydroxyphenyl)-4-(3'-beta-carboxypropionyl-4'-hydroxyphenyl)hexane*

31 parts of the acid described in Example 17 are refluxed for 2 hours with a solution of 215 parts of hydriodic acid (specific gravity 1.7) in 120 parts of glacial acetic acid and 100 parts of acetic anhydride. The purified low-melting form of the 3-(4'-hydroxyphenyl)-4-(3'-beta-carboxypropionyl-4'-methoxyphenyl)hexane is isolated by the method of Example 16 and melts at about 55° to 65° C.

EXAMPLE 19

*2-(4'-methoxyphenyl)-3-(3'-beta-carboxypropionyl-4'-methoxyphenyl)butane.*

This compound is obtained by the process described in Example 15 using 27 parts of 2,3-bis-(4'-methoxyphenyl)butane, 10 parts of succinic anhydride and 30 parts of anhydrous aluminum chloride in 150 parts of nitrobenzene.

EXAMPLE 20

*2-(4'-hydroxyphenyl)-3-(3'-beta-carboxypropionyl-4'-hydroxyphenyl)butane.*

The product of Example 19 is demethylated by the procedure described in Example 16 using 185 parts of hydriodic acid (specific gravity 1.7) in a mixture of glacial acetic acid and acetic anhydride.

EXAMPLE 21

*3-(4'-methoxyphenyl)-4-(3'-delta-carboxyvaleryl-4'-methoxyphenyl)hexane.*

To a solution of 15 parts of 3,4-bis-(p-methoxyphenyl)hexane and 7.5 parts of adipic anhydride in 100 parts of nitrobenzene at 4° C. are added portionwise with good agitation 16 parts of anhydrous aluminum chloride. After standing overnight, the mixture is quenched in ice containing 25 parts of 20% muriatic acid. The solvent is removed by steam distillation and the residue is chilled. The precipitate of crude keto acid is removed and dissolved in dilute sodium carbonate solution. This is treated with decolorizing charcoal, filtered and added slowly to an excess of dilute mineral acid. The acid obtained has the structural formula

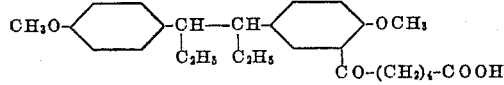

EXAMPLE 22

*3-(4'-hydroxyphenyl)-4-(3'-delta-carboxyvaleryl-4'-hydroxyphenyl)hexane.*

The acid described in Example 21 is demethylated by heating with 150 parts of hydriodic acid (specific gravity 1.7) in a mixture of 100 parts of glacial acetic acid and 90 parts of acetic anhydride. The acid solution is then poured into ice water and the precipitate of the 3-(4'-hydroxyphenyl)-4-(3'-delta-carboxyvaleryl - 4'-hydroxyphenyl)hexane collected on a filter, washed and dried.

EXAMPLE 23

Other compounds which are within the scope of this invention include the following:

A. 3,3'-dihydroxy-4-delta-carboxyvalerylbibenzyl of the formula—

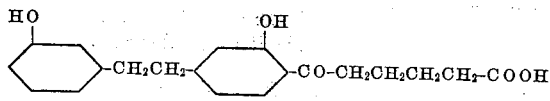

and 3,3'-dihydroxy-6-delta-carboxyvalerylbibenzyl of the formula—

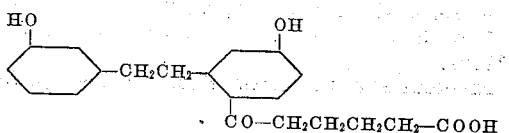

These compounds are prepared from 3,3'-dimethoxybibenzyl by the methods of Examples 11 and 12.

B. 3-(p-hydroxyphenyl)-5-(p-hydroxy-m-beta-carboxypropionylphenyl)-4-ethylheptane—

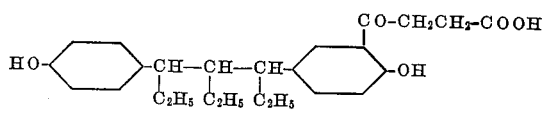

This substance is produced from 3,5-di-(p-methoxyphenyl)-4-ethylheptane and succinic anhydride according to the processes of Example 15.

EXAMPLE 24

*2,2',4,4'-tetramethoxy-5,5'-bis-(beta-carboxypropionyl)biphenyl*

1125 parts of anhydrous aluminum chloride are added portionwise at 0° to 3° C. to an agitated suspension of 548 parts of 2,2',4,4'-tetramethoxybiphenyl and 420 parts of succinic anhydride in 4800 parts of nitrobenzene. Stirring is continued for 2 additional hours at 0° and the mixture is then allowed to stand at room temperature for 15 hours. Hydrolysis, steam distillation of the solvent and work-up in the usual manner through alkaline extraction produces a mixture of crude acids due to partial cleavage of one or more of the methoxyl groups. Remethylation with an excess of dimethyl sulfate in potassium hydroxide solution yields a 2,2',4,4'-tetramethoxy-5,5'-bis-(beta-carboxypropionyl)biphenyl which shows only a faint ferric chloride test. Two successive crystallizations from acetic acid using charcoal as a clarifying agent yield the pure acid in crystals which melt at about 232° C.

EXAMPLE 25

*2,2'-dimethoxy-4,4'-dihydroxy-5,5'-bis-(beta-carboxypropionyl)-biphenyl*

A suspension of 18 parts of the 2,2',4,4'-tetramethoxy-5,5'-bis-(beta-carboxypropionyl)-biphenyl, described in Example 24, is refluxed in 540 parts of 47% hydriodic acid and 157 parts of acetic anhydride for 40 minutes. The microcrystalline suspension is diluted with ice water, collected on a filter and rinsed to obtain pale yellow crystals which are insoluble in common organic solvents. Extraction of impurities with boiling acetic acid leaves nearly colorless 2,2'-dimethoxy-4,4'-dihydroxy-5,5'-bis-(beta-carboxypropionyl)biphenyl, which melts at about 315° C. with decomposition. A very dilute suspension in ethanol gives a muddy brown color with ferric chloride.

We claim:

1. A compound of the structural formula

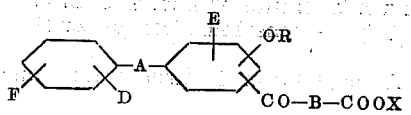

wherein A is a lower bivalent aliphatic hydrocarbon radical containing one to eight carbon atoms, inclusive, B is a lower bivalent aliphatic hydrocarbon radical containing two to eight carbon atoms, inclusive, E and F are members of the class consisting of hydrogen, halogen, lower alkyl, hydroxyl and lower alkoxyl radicals, D is a member of the class consisting of hydrogen, halogen, hydroxyl, lower alkoxyl radicals and radicals of the formula —CO—B—COOX, R is a member of the class consisting of hydrogen and lower alkyl radicals, and X is a member of the group consisting of hydrogen and one equivalent of a cation.

2. A compound of the structural formula

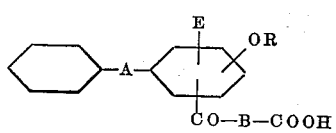

wherein A is a lower bivalent aliphatic hydrocarbon radical containing one to eight carbon atoms, inclusive, B is a lower bivalent aliphatic hydrocarbon radical containing two to eight carbon atoms, inclusive, E is a lower alkoxyl radical and R is a lower alkyl radical.

3. A compound of the structural formula

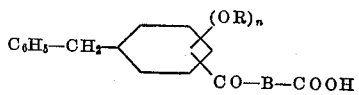

wherein B is a lower bivalent aliphatic hydrocarbon radical containing two to eight carbon atoms, inclusive, R is a lower alkyl radical and $n$ is an integer smaller than 3.

4. A compound as defined in claim 3, wherein R is a methyl group.

5. A compound of the structural formula

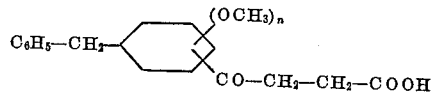

wherein $n$ is an integer smaller than 3.

6. A beta-(benzyldimethoxybenzoyl)propionic acid.

7. A compound of the structural formula

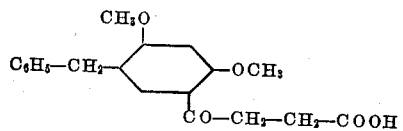

8. A compound of the structural formula

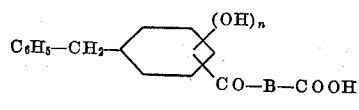

wherein B is a lower bivalent aliphatic hydro-

9. A compound of the structural formula

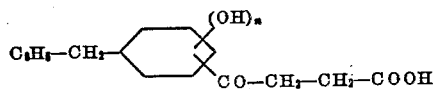

wherein $n$ is an integer smaller than 3.

10. A beta-(benzyldihydroxybenzoyl) propionic acid.

11. A compound of the structural formula

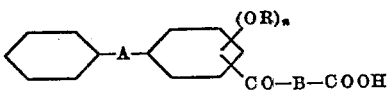

wherein A is a lower bivalent aliphatic hydrocarbon radical containing one to eight carbon atoms, inclusive, B is a lower bivalent aliphatic hydrocarbon radical containing two to eight carbon atoms, inclusive, R is a lower alkyl radical and $n$ is an integer smaller than 3.

12. A compound of the structural formula

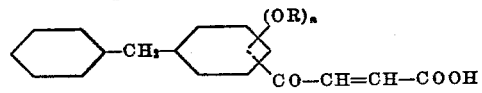

wherein R is a lower alkyl radical and $n$ is an integer smaller than 3.

13. A compound of the structural formula

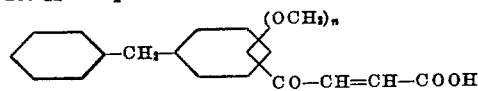

wherein $n$ is an integer smaller than 3.

ROBERT R. BURTNER.
HARRY A. ARBIT.

REFERENCES CITED

The following references are of record in the file of this patent:

Fieser et al.: Chem. Abs., vol. 30, p. 7565 (1936).
Trivedi et al.: Chem. Abs., vol. 36, col. 3801 (1942).
Nicholas et al.: J. Chem. Soc., vol. 1949, p. 257.